United States Patent
Solihin

(10) Patent No.: US 8,832,414 B2
(45) Date of Patent: Sep. 9, 2014

(54) DYNAMICALLY DETERMINING THE PROFITABILITY OF DIRECT FETCHING IN A MULTICORE ARCHITECTURE

(75) Inventor: Yan Solihin, Apex, NC (US)

(73) Assignee: Empire Technology Development LLC, Wilmington, DE (US)

( * ) Notice: Subject to any disclaimer, the term of this patent is extended or adjusted under 35 U.S.C. 154(b) by 109 days.

(21) Appl. No.: 13/387,210

(22) PCT Filed: Mar. 24, 2011

(86) PCT No.: PCT/US2011/029759
§ 371 (c)(1),
(2), (4) Date: Jan. 26, 2012

(87) PCT Pub. No.: WO2012/128769
PCT Pub. Date: Sep. 27, 2012

(65) Prior Publication Data
US 2012/0246446 A1    Sep. 27, 2012

(51) Int. Cl.
*G06F 15/00* (2006.01)
*G06F 12/00* (2006.01)
*G06F 9/30* (2006.01)
*G06F 12/08* (2006.01)

(52) U.S. Cl.
CPC ............. *G06F 9/30* (2013.01); *G06F 12/0802* (2013.01); *G06F 12/0806* (2013.01)
USPC .... 712/205; 711/118; 711/119; 711/E12.017; 711/E12.023; 712/E9.016

(58) Field of Classification Search
CPC .... G06F 9/30; G06F 12/0802; G06F 12/0806
USPC .................................. 712/205; 711/118, 119
See application file for complete search history.

(56) References Cited

U.S. PATENT DOCUMENTS

2009/0172424 A1    7/2009  Cai et al.
2011/0067029 A1    3/2011  Wolfe et al.

OTHER PUBLICATIONS

International Search Report and Written Opinion dated Aug. 18, 2011 in PCT Application No. PCT/US11/29759.
Chaparro, P. et al., "Thermal-Aware Clustered Microarchitectures," 2004 IEEE International Conference on Computer Design (ICCD'04), Oct. 11-13, 2004.
Das, "Microarchitectural Approaches for Optimizing Power and Profitability in Multi-core Processors," Northwestern University, Oct. 2010.

(Continued)

*Primary Examiner* — Aracelis Ruiz
(74) *Attorney, Agent, or Firm* — Hope Baldauff, LLC

(57) ABSTRACT

Technologies are generally described herein for determining a profitability of direct fetching in a multicore processor. The multicore processor may include a first and a second tile. The first tile may include a first core and a first cache. The second tile may include a second core, a second cache, and a fetch location pointer register (FLPR). The multicore processor may migrate a thread executing on the first core to the second core. The multicore processor may store a location of the first cache in the FLPR. The multicore processor may execute the thread on the second core. The multicore processor may identify a cache miss for a block in the second cache. The multicore processor may determine whether a profitability of direct fetching of the block indicates direct fetching or directory-based fetching. The multicore processor may perform direct fetching or directory-based fetching based on the determination.

24 Claims, 6 Drawing Sheets

(56) References Cited

OTHER PUBLICATIONS

Hammoud et al., "ACM: An Efficient Approach for Managing Shared Caches in Chip Multiprocessors," Proceedings of the 4th International Conference on High Performance and Embedded Architectures and Compilers (HiPEAC), Jan. 2009.

Li, T. et al., "Operating System Support for Overlapping-ISA Heterogeneous Multi-Core Architectures," 2010 IEEE 16th International Symposium on High Performance Computer Architecture (HPCA), Jan. 9-14, 2010.

Powell, M. et al., "Architectural Core Salvaging in a Multi-Core Processor for Hard-Error Tolerance," ISCA '09 Proceedings of the 36th Annual International Symposium on Computer Architecture, 2009.

Suleman, M. et al., "Accelerating Critical Section Execution with Asymmetric Multi-Core Architectures," ASPLOS '09 Proceeding of the 14th International Conference on Architectural Support for Programming Languages and Operating Systems, 2009.

504 AT LEAST ONE OF

ONE OR MORE INSTRUCTIONS FOR MIGRATING A THREAD EXECUTING ON A FIRST CORE AT A FIRST TILE IN THE MULTICORE PROCESSOR FROM THE FIRST TILE TO A SECOND CORE AT A SECOND TILE IN THE MULTICORE PROCESSOR, THE FIRST TILE COMPRISING THE FIRST CORE AND A FIRST CACHE, THE SECOND TILE COMPRISING A SECOND CORE, A SECOND CACHE, AND A FETCH LOCATION POINTER REGISTER (FLPR);

ONE OR MORE INSTRUCTIONS FOR STORING A LOCATION OF THE FIRST CACHE IN THE FLPR;

ONE OR MORE INSTRUCTIONS FOR EXECUTING THE THREAD ON THE SECOND CORE;

ONE OR MORE INSTRUCTIONS FOR IDENTIFYING A CACHE MISS FOR A BLOCK IN THE SECOND CACHE;

ONE OR MORE INSTRUCTIONS FOR EVALUATING A PROFITABILITY OF DIRECT FETCHING OF THE BLOCK TO DETERMINE WHETHER THE PROFITABILITY INDICATES DIRECT FETCHING OR DIRECTORY-BASED FETCHING;

ONE OR MORE INSTRUCTIONS FOR PERFORMING DIRECT FETCHING OF THE BLOCK FROM THE FIRST CACHE TO THE SECOND CACHE, WHEN THE PROFITABILITY OF DIRECT FETCHING OF THE BLOCK IS DETERMINED TO INDICATE DIRECT FETCHING; OR

ONE OR MORE INSTRUCTIONS FOR PERFORMING DIRECTORY-BASED FETCHING OF THE BLOCK FROM THE FIRST CACHE TO THE SECOND CACHE, WHEN THE PROFITABILITY OF DIRECT FETCHING OF THE BLOCK IS DETERMINED TO INDICATE DIRECTORY-BASED FETCHING.

*Fig. 5B*

DYNAMICALLY DETERMINING THE PROFITABILITY OF DIRECT FETCHING IN A MULTICORE ARCHITECTURE

BACKGROUND

Unless otherwise indicated herein, the materials described in this section are not prior art to the claims in this application and are not admitted to be prior art by inclusion in this section.

As more and more cores become integrated into a single multicore chip, thread migration may be increasingly utilized in order to manage and improve functionality, performance, and/or temperature of the multicore chip. In a typical thread migration scenario, a first core may execute a thread and utilize a first cache. As the first core executes the thread, the first cache may fill with requested data retrieved from memory. After the first cache fills, the first cache may yield cache hits whereby the first core can efficiently retrieve the requested data from the first cache.

During a thread migration, a controller may migrate the thread from the first core to a second core such that the second core takes over execution of the thread. The second core may utilize a second cache that is "cold" (i.e., empty). As a result, the second cache may yield, instead of cache hits, cache misses whereby the requested data is not found in the second cache. After each cache miss, the requested data may be fetched on-demand from another cache, such as the first cache, on the multicore chip. When the second cache "warms up" (i.e., fills with the requested data), the second cache may experience cache hits. However, warming up the second cache through on-demand fetching can incur significant time and energy costs. Such costs can be especially burdensome when filling large caches and in architectures implementing frequent thread migration.

SUMMARY

The present disclosure generally describes techniques for determining a profitability of direct fetching in a multicore processor. The multicore processor may be configured to perform methods where profitability of direct fetching may be determined. Some example methods may include migrating a thread executing on a first core at a first tile in a multicore processor from the first tile to a second core at a second tile in the multicore processor. The first tile may include the first core and a first cache. The second tile may include the second core, a second cache, and a fetch location pointer register (FLPR). Example methods may also include storing a location of the first cache in the FLPR at the second tile, and executing the thread on the second core, upon migrating the thread from the first tile to the second tile. Example methods may further include identifying a cache miss for a block in the second cache, evaluating a profitability of direct fetching of the block to determine whether the profitability indicates direct fetching or directory-based fetching, when the profitability of direct fetching of the block is determined to indicate direct fetching, performing direct fetching of the block from the first cache to the second cache, and when the profitability of direct fetching of the block is determined to indicate directory-based fetching, performing directory-based fetching of the block from the first cache to the second cache, upon executing the thread on the second core.

The present disclosure generally also describes some multicore processors. Some example multicore processors may include a first tile and a second tile. The first tile may include a first core and a first cache. The second tile may include a second core, a second cache, and a fetch location pointer register (FLPR). Some example multicore processors may be configured to migrate a thread executing on the first core from the first tile to the second core at the second tile. Example multicore processors may also be configured to store a location of the first cache in the FLPR, and execute the thread on the second core, upon migrating the thread from the first tile to the second tile. Example multicore processors may further be configured to identify a cache miss for a block in the second cache, evaluate a profitability of direct fetching of the block to determine whether the profitability indicates direct fetching or directory-based fetching, when the profitability of direct fetching of the block is determined to indicate direct fetching, perform direct fetching of the block from the first cache to the second cache, and when the profitability of direct fetching of the block is determined to indicate directory-based fetching, perform directory-based fetching of the block from the first cache to the second cache, upon executing the thread on the second core.

The present disclosure generally also describes some multicore processors. Some example multicore processors may include a first tile and a second tile. The first tile may include a first core, a first instruction cache, and a first data cache. The second tile may include a second core, a second instruction cache, a second data cache, a first fetch location pointer register (FLPR), and a second FLPR. Some example multicore processors may be configured to migrate a thread executing on the first core from the first tile to the second core at the second tile. Example multicore processors may also be configured to store a location of the first cache in the FLPR, and execute the thread on the second core, upon migrating the thread from the first tile to the second tile. Example multicore processors may further be configured to identify an instruction cache miss for a first block in the second instruction cache and a data cache miss for a second block in the second data cache, evaluate a first probability of direct fetching of the first block to determine whether the first probability indicates direct fetching or directory-based fetching, when the first probability of direct fetching of the first block is determined to indicate direct fetching, perform direct fetching of the first block from the first instruction cache to the second instruction cache, when the first probability of directory fetching of the first block indicates directory-based fetching, perform directory-based fetching of the first block from the first instruction cache to the second instruction cache, evaluate a second probability of direct fetching of the second block to determine whether the second probability indicates direct fetching or directory-based fetching, when the second probability of direct fetching of the second block is determined to indicate direct fetching, perform direct fetching of the second block from the first data cache to the second data cache, and when the second probability of directory fetching of the second block indicates directory-based fetching, perform directory-based fetching of the second block from the first data cache to the second data cache, upon executing the thread on the second core.

The present disclosure generally also describes some computer-readable storage media. Some computer-readable storage media may include computer-executable instructions stored thereon which, when executed by a computer, cause the computer to perform various operations. Some example computer-executable instructions may cause the computer to migrate a thread executing on a first core at a first tile in a multicore processor from the first tile to a second core at a second tile in the multicore processor. The first tile may include the first core and a first cache. The second tile may include the second core, a second cache, and a fetch location pointer register (FLPR). Example computer-executable instructions may also cause the computer to store a location of the first cache in the FLPR at the second tile, and execute the thread on the second core, upon migrating the thread from the first tile to the second tile. Example computer-executable instructions may further cause the computer to identify a cache miss for a block in the second cache, evaluate a profitability of direct fetching of the block to determine whether the profitability indicates direct fetching or directory-based fetching, when the profitability of direct fetching of the block is determined to indicate direct fetching, perform direct fetching of the block from the first cache to the second cache, and when the profitability of direct fetching of the block is determined to indicate directory-based fetching, perform directory-based fetching of the block from the first cache to the second cache, upon executing the thread on the second core.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIGS. 5A-5B is a schematic diagram illustrating computer program products that include a computer program for executing a computer process on a computing device, all arranged according to at least some embodiments presented.

DETAILED DESCRIPTION

Figure 1:
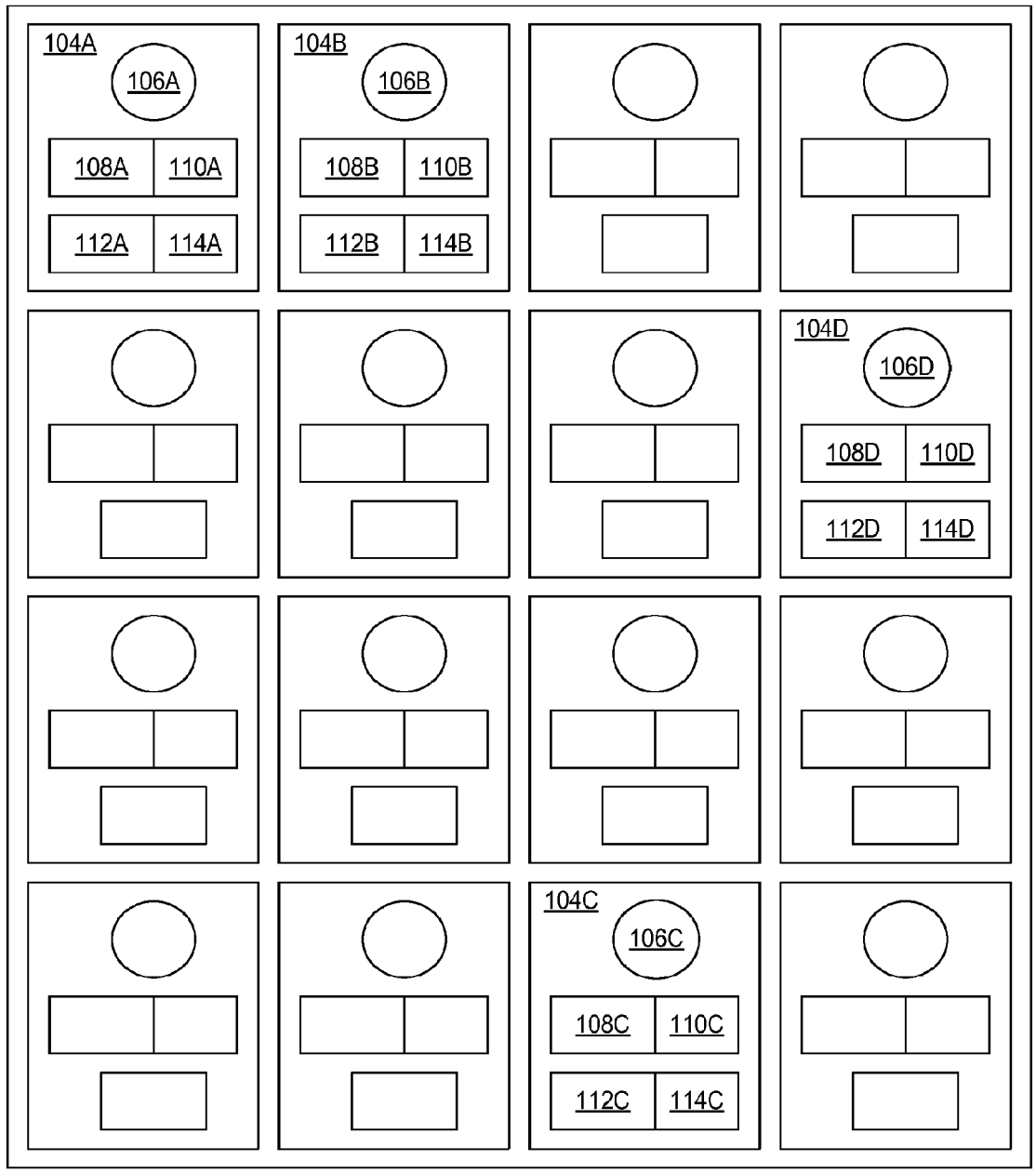
FIG. 1 is a functional block diagram illustrating an example multicore architecture adapted to dynamically evaluate a profitability measure and selectively perform direct fetching or directory-based fetching based on the profitability measure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to an attachment process whereby a new tile to which a thread is migrated may be configured to attach itself to a cache on an old tile from which the thread is migrated. In an illustrative example, a multicore processor may include a first tile, a second tile, a third tile, and a fourth tile. The first tile may include a first core, an associated first cache, and a first directory. The second tile may include a second core, an associated second cache, and a second directory. The third tile may include a third core, an associated third cache, and a third directory. The fourth tile may include a fourth core, an associated fourth cache, and a fourth directory. The first core may be configured to execute a thread.

When the thread is migrated from the first tile to the second tile, the second tile may be configured to store a location of the first cache in a fetch location point register ("FLPR") or other suitable storage location on the first tile. Because the first core most recently executed the thread prior to the thread migration, temporal locality may dictate that the first cache likely contains requested cache blocks when the second core executes the thread. Thus, when the second cache suffers a cache miss where a block requested by the second core while executing the thread cannot be found in the second cache, the second tile may be configured to retrieve the location from the FLPR and query the first cache, as identified by the location, for the requested block.

If the first cache contains the requested block, then the first cache may be configured to respond to the query by providing the requested block to the second tile. This process whereby a requested block is retrieved without accessing a directory may be referred to herein as "direct fetching." However, even when direct fetching is initially successful, as time passes, the first cache may no longer contain requested blocks. If the first cache does not contain the requested block, then the first cache may be configured to respond to the query with a negative acknowledgement or some other suitable message. Upon receiving the negative acknowledgement, the second tile may be configured to query a relevant directory corresponding to a block address of the requested block for a location of a cache storing the requested block. The second tile may then retrieve the requested block from the cache identified by the relevant directory. This process whereby a requested block is retrieved by accessing a relevant directory may be referred to herein as "directory-based fetching"

In an illustrative example of directory-based fetching, the third directory may correspond to the block address of the requested block. As a result, the first tile may be configured to query the third directory for a location of a cache that contains the requested block. The third directory may be configured to respond to the query by notifying the fourth cache based on a location of the fourth cache. The fourth cache may then respond by providing the requested block to the second tile.

As shown in the previous example, direct fetching, when successful, can provide significant time and energy savings over directory-based fetching. Whereas direct fetching may involve a two-hop coherence transaction between two tiles (e.g., the first tile and the second tile in the above example), directory-based fetching may involve a three-hop coherence transaction between three tiles (e.g., the first tile, the third tile, and the fourth tile in the above example). However, when direct fetching is unsuccessful, a tile may subsequently rely on directory-based fetching to fetch the requested block. As a result, failure in direct fetching may involve a five-hop coherence transaction (e.g., two-hops in attempting to perform direct fetching and three-hops to perform directory-based fetching when direct fetching fails), thereby incurring additional time and energy costs over simply relying on directory-based fetching from the beginning.

In order to mitigate such additional time and energy costs with respect to direct fetching, a profitability determination process may be adapted to determine whether a given tile should stop direct fetching for retrieving requested cache blocks and transition to directory-based fetching. Through the profitability determination process, the second tile, for example, may be configured to measure a first latency time for performing directory-based fetching over an interval. The second tile may further be configured to measure a second latency time for performing the direct fetching over the interval. Upon measuring the first latency time and the second latency time, the second tile may be configured to determine a profitability measure based on the first latency time, the second latency time, and a success rate of the direct fetching over the interval.

The profitability measure may be configured to indicate whether direct fetching is profitable over the interval. If the profitability measure indicates that the direct fetching was profitable, then the second tile may be configured to continue performing direct fetching over a next interval. If the profitability measure indicates that direct fetching is no longer profitable, then the second tile may be configured to stop performing direct fetching and transition to performing directory-based fetching. The second tile may be configured to dynamically evaluate, over multiple intervals, a profitability measure over a preceding interval in order to determine whether to continue performing direct fetching over a succeeding interval immediately following the preceding interval or to stop performing direct fetching and transition to performing directory-based fetching. By dynamically evaluating the profitability measure and selectively performing direct fetching or directory-based fetching based on the evaluation of the profitability measure, the second tile can benefit from efficiencies of direct fetching while also mitigating potential additional time and energy costs when direct fetching fails.

Turning now to FIG. 1, a functional block diagram illustrates an example multicore architecture 100 adapted to dynamically evaluate a profitability measure and selectively perform direct fetching or directory-based fetching based on the profitability measure, in accordance with at least some embodiments presented herein. The architecture 100 may include multiple tiles, including a tile A (104A), a tile B (104B), a tile C 104C, and a tile D 104D. The tiles 104A-104D may include cores 106A-106D, caches 108A-108D, directories 110A-110D. The tiles 104A-104D may be collectively or generally referred to as tiles 104. The cores 106A-106D may be collectively or generally referred to as cores 106. The caches 108A-108D may be collectively or generally referred to as caches 108. The directories 110A-110D may be collectively or generally referred to as directories 110. In the example illustrated in FIG. 1, the architecture 100 may include sixteen tiles 104. In other embodiments, the architecture 100 may include any suitable number of tiles and/or any suitable number of cores in a tile sharing a cache.

Each of the cores 106, the caches 108, and the directories 110 may correspond to one of the tiles 104. The tiles 104 may further include controllers 112A-112D and FLPRs 114A-114D. The controllers 112A-112D may be collectively or generally referred to as controllers 112. The FLPRs 114A-114D may be collectively or generally referred to as FLPRs 114. The controllers 112 may be configured to perform operations on the respective caches 108 and the respective directories 110, as well as to enable communications between the tiles 104. In some other embodiments, one or more of the tiles 104 may each include multiple controllers, such as separate cache controllers and directory controllers. Each respective FLPR in the FLPRs 114 may be configured to store a location of a cache corresponding to an old tile from which a thread is migrated to a new tile corresponding to the FLPR.

The directories 110 may each be configured to map block addresses to one or more of the caches 108 that store blocks corresponding to the block addresses. Each of the directories 110 may be associated with a set of block addresses, for example, a range of sequential addresses. In some other implementations, the block addresses assigned to each of the directories 110 may be non-sequential (e.g., interleaved at various granularities). A group of block addresses may be equally allocated among the directories 110. For example, the directory 110A may be associated with a first range of sequential block addresses, the directory 110B may be associated with a second range of sequential block addresses, and so forth. The mapping between the directories 110 and the block addresses may be fixed or variable. Further, the mapping between the directories 110 may be known by the controllers 112 (e.g., pre-programmed on the controllers 112) or retrieved by the controllers 112 from a suitable source (e.g., memory, storage device, database, etc.).

Figure 2:
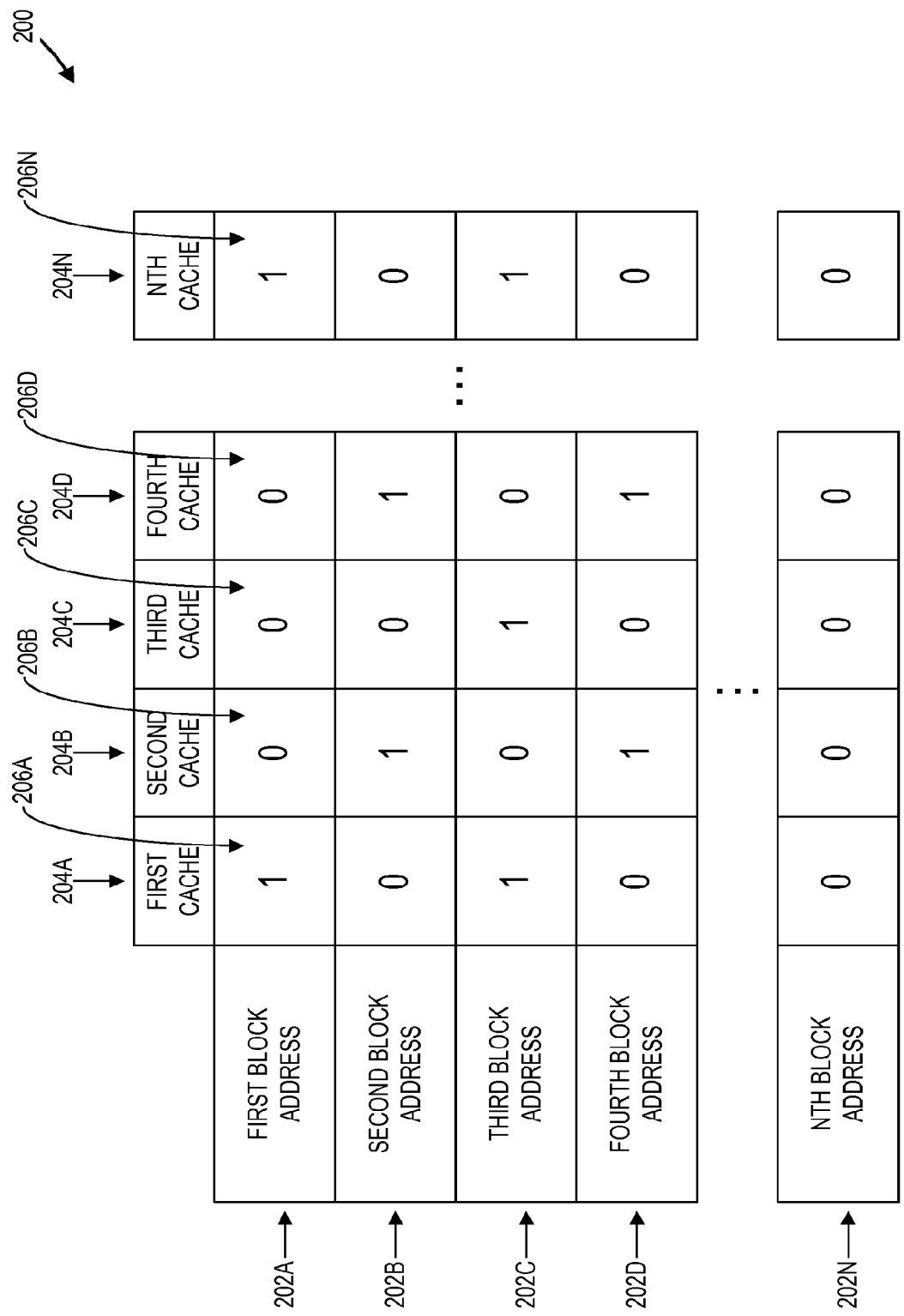
FIG. 2 is a diagram illustrating a table representing multiple example bit vectors adapted to indicate one or more caches that store a block corresponding to a given block address.

In some embodiments, each of the directories 110 may include multiple bit vectors, each of which may correspond to one block address in the set of block addresses. An illustrative example of a bit vector is shown in FIG. 2, which is described in greater detail below. Each bit vector may be configured to store a number of bits corresponding to the number of the caches 108. For example, each bit vector may be configured to store sixteen bits, where each bit corresponding to one of sixteen caches (e.g., caches 108 of FIG. 1). Each of the sixteen bits may be configured with one of at least two bit values. A first bit value (e.g., logical "1") may indicate that a corresponding cache stores the block corresponding to the block address associated with the bit vector. A second bit value (e.g., logical "0") may indicate that the corresponding cache does not store the block corresponding to the block address associated with the bit vector. Various other embodiments may rely on other suitable directory formats, such as coarse bit vector, limited pointers, or sparse directory.

In a first example implementation, the tile B (104B) may be configured to execute a thread on the core B (106B). While executing the thread, the core B (106B) may be configured to retrieve data from memory (not shown) and store the data on the cache B (108B). The controller B (112B) may be adapted to migrate the thread from the tile B (104B) to the tile A (104A) such that core A (104A) may then execute the thread. Because the cache A (108A) may initially be cold, the cache A (108A) may yield cache misses for requested data during the execution of the thread. In response to each cache miss, the controller A (112A) may be configured to determine the directory that is mapped to the block address of the requested data. As previously described, the mapping between ranges of block addresses and their respective directories 110 may be known by the controllers 112 or retrieved from a suitable source.

In this first example, the controller A (112A) may be configured to determine that the directory C (110C) maps to the block address of the requested data. As a result, the controller A (112A) may be adapted to query the controller C (112C) for caches that store a block corresponding to the block address. The directory C (110C) may include a bit vector that identifies caches that store the block corresponding to the block address. In this example, the directory C (110C) may identify that the cache B (108B) stores the block corresponding to the block address. Thus, the controller C (112C) may be adapted to forward the query to the controller B (112B). The controller B (112B) may respond to the query by providing the block from the cache B (108B) to the controller A (112A). The controller A (112A) may then be configured to store the block in the cache A (108A).

The first example implementation, which is referred to herein as "directory-based fetching," involves a three-hop coherence transaction between tile A, (104A), tile B (104B), and tile C (104C). Three-hop coherence transactions can be costly, especially since the cache A (108A) may yield many cache misses when the cache A 108A is cold. After each cache miss, the controller A (112A) may be configured to initiate a separate query to the relevant directory, even though, in many cases, the data will be retrieved from the same source (e.g., cache B (108B) in the first example). Because the core B (106B) most recently executed the thread prior to the thread migration, temporal locality may dictate that the cache B (108B) likely contains requested cache blocks when the core A 106A executes the thread. A second example implementation will now be described that is configured to leverage temporal locality in order to save time and energy costs.

In the second example implementation, when the controller B (112B) migrates the thread from the tile B (104B) to the tile A (104A), the controller A (112A) may be configured to store the location of the cache B (108B) in the FLPR A 114A. When the cache A (108A) yields cache misses for requested data during execution of the thread, the controller A (112A) may be configured to retrieve the location of the cache B (108B) from the FLPR A 114A. The controller B (112B) may correspond to the cache B (108B) as identified by the retrieved location. As a result, the controller A (112A) may then be configured to query the controller B (112B) for the requested data. The controller B (112B) may be configured to respond to the query by providing a block corresponding to the requested data from the cache B (108B) to the controller A (112A). The controller A (112A) may then be configured to store the block in the cache A (108A).

By storing the location of the cache B (108B) in the FLPR A 114A, the tile A (104A) can be adapted to leverage temporal locality by directly querying the controller B (112B) with the assumption that temporal locality dictates that the requested data is likely stored in the cache B (108B). When the cache B (108B) contains the requested data, the controller A (112A) can be adapted to retrieve the requested data directly from the cache B (108B) without having to access the directory C (110C). In contrast to the three-hop coherence transaction of the first example implementation, the second example implementation, which is referred to herein as "direct fetching," involves a two-hop coherence transaction between tile A (104A) and tile B (104B). While direct fetching may provide significant time and energy cost savings when the cache B (108B) contains the requested data, direct fetching can incur additional time and energy costs over directory-based fetching when the cache B (108B) does not contain the requested data. A third example implementation will now be described where direct fetching fails and incurs additional time and energy costs over directory-based fetching.

In the third example implementation, when the cache A (108A) yields cache misses for requested data during execution of the thread, the controller A (112A) may be configured to retrieve the location of the cache B (108B) from the FLPR A 114A. The controller B (112B) may correspond to the cache B (108B) as identified by the retrieved location. As a result, the controller A (112A) may then be configured to query the controller B (112B) for the requested data. However, in this third example, the cache B (108B) may not contain the requested data. Thus, the controller B (112B) may be configured to respond to the query by sending a negative acknowledgement to the controller A (112A). The negative acknowledgement may indicate that the cache B (108B) does not contain the requested data (i.e., that direct fetching failed).

Upon receiving the negative acknowledgement, the controller A (112A) may be configured to perform directory-based fetching. The controller A (112A) may be adapted to query the controller C (112C) for caches that store a block corresponding to the block address. The directory C 110C may include a bit vector that identifies caches that store the block corresponding to the block address. In this example, the directory C 110C may identify that the cache D 108D stores the block corresponding to the block address. Thus, the controller C (112C) may be adapted to forward the query to the controller D 112D. The controller D 112D may respond to the query by providing the block from the cache D 108D to the controller A (112A). The controller A (112A) may then be configured to store the block in the cache A (108A).

In this third example implementation, the controller A (112A) essentially performs both direct fetching and directory-based fetching, the combination of which involves a five-hop coherence transaction. While direct fetching, when successful, can provide significant time and energy cost savings, the speculative nature of direct fetching and the penalty when direct fetching fails can overshadow various efficiencies gained from implementing direct fetching. In order to mitigate these drawbacks with respect to direct fetching, the controller A (112A) may be configured to dynamically evaluate a profitability measure and selectively perform direct fetching or directory-based fetching based on the profitability measure.

An average time to serve N fetches can be defined by the following equation: $T = X \cdot T_{df} + (N-X) \cdot (T_{df} + T_{trad})$, where X may represent a number of fetches in N fetches where direct fetching is successful, $T_{df}$ may represent a first latency time to perform direct fetching, and $T_{trad}$ may represent a second latency time to perform directory-based fetching. A first portion of the equation, $X \cdot T_{df}$, may define a total time over X fetches when direct fetching is successful. A second portion of the equation, $(N-X)(T_{df} + T_{trad})$, may define a total time spent over N−X fetches when direct fetching is unsuccessful. That is, when direct fetching is unsuccessful, each fetch may utilize a sum of the first latency time $T_{df}$ and the second latency time $T_{trad}$.

Without direct fetching (i.e., utilizing directory-based fetching), an average time to serve N fetches can be defined by the following equation: $N \cdot T_{trad}$. It follows then that direct fetching can be considered profitable over directory-based fetching when $T < N \cdot T_{trad}$. The equation $T < N \cdot T_{trad}$ may be satisfied when $X/N > T_{df}/T_{trad}$, where X/N may represent a success rate of direct fetching and $T_{df}/T_{trad}$ may represent a latency ratio of the first latency time $T_{df}$ to the second latency time $T_{trad}$. The inequality $X/N > T_{df}/T_{trad}$ may be referred to herein as the "profitability measure."

The controller A (112A) may be configured to monitor the first latency time $T_{df}$ and the second latency time $T_{trad}$ over N fetches. In some embodiments, the number N may be defined based on cache size and block size with respect to the caches 108. For example, if cache size is 512 kilobytes and block size is 64 bytes, each of the caches 108 may hold 8,192 total blocks. If the 8,192 total blocks are divided by 32 intervals, then N is set as 256 fetches. In this example, the controller A (112A) may be configured to start a timer at the beginning each fetch and to stop the timer at the end of each fetch. Over a set of 256 fetches, the controller A (112A) may be configured to average the times utilized to perform each direct fetch in order to determine the first latency time $T_{df}$. Over the set of 256 fetches, the controller A (112A) may also be configured to average the times utilized to perform each directory-based fetch in order to determine the second latency time $T_{trad}$. Upon determining the first latency time $T_{df}$ and the second latency time $T_{trad}$, the controller A (112A) may be configured to determine the latency ratio $T_{df}/T_{trad}$ of the first latency time $T_{df}$ to the second latency time $T_{trad}$.

In addition to monitoring the first latency time $T_{df}$ and the second latency time $T_{trad}$ over N fetches, the controller A (112A) may also be configured to count the number of direct fetches X over N fetches in a given interval. Upon counting the number of direct fetches X over N fetches, the controller A (112A) may be configured to determine the success rate X/N of direct fetching over N fetches. Upon determining the latency ratio $T_{df}/T_{trad}$ of the first latency time $T_{df}$ to the second latency time $T_{trad}$ and the success rate X/N over N fetches, the controller A (112A) may be configured to determine whether the success rate X/N is greater than the latency ratio $T_{df}/T_{trad}$ according to the profitability measure. If the success rate X/N is greater than the latency ratio $T_{df}/T_{trad}$ then the controller A (112A) may be configured to perform direct fetching over a next interval following the given interval. If the success rate X/N is not greater than the latency ratio then the controller A (112A) may be configured to stop performing direct $T_{df}/T_{trad}$ fetching and transition to performing directory-based fetching over succeeding intervals.

While the controller A (112A) is configured to perform direct fetching, the controller A (112A) may also be configured to continue monitoring the first latency time $T_{df}$ and the second latency time $T_{trad}$ and counting the number of direct fetches X over each set of N fetches. In this way, the controller A (112A) can continue to dynamically evaluate the profitability measure and selectively perform direct fetching or directory-based fetching according to the evaluation of the profitability measure. Further, by monitoring the first latency time $T_{df}$ and the second latency time $T_{trad}$ during each interval, the profitability measure can be evaluated with respect to various relevant factors, such as distance between the new core and the old core, congestion on the on-chip network, or the like, even as these factors change in real-time or near real-time.

In some other embodiments, the profitability measure may be adapted to determine a profitability of translation lookaside buffer ("TLB") state migration. The profitability measure may be utilized to decide when it is profitable to serve a TLB miss by invoking a TLB miss handler and performing a page table walk locally or attempt to directly fetch a TLB entry from a TLB in the old tile from which a TLB state is migrated. In contrast to a cache miss, a TLB miss can be much more expensive when a cache is cold. A multi-level page table walk may involve multiple memory accesses (e.g., four accesses in a four-level page table in a x86-64 architecture). If each memory access incurs a cache miss, then a TLB miss latency may be at least four times a memory access latency. As a result, direct fetching can be significantly beneficial for handling TLB state migration. As data from the page table entries start to be cached locally, direct fetching can be stopped as direct fetching becomes less beneficial.

In some other embodiments, each of the tiles 104 may include a separate instruction cache and data cache. In such implementations, separate profitability measures may be adapted to determine a profitability of the instruction cache and the profitability of the data cache. The success rates of direct fetching may be separately tracked with respect to the instruction cache and the data cache. Further, latencies of direct fetching and directory-based fetching may be separately monitored with respect to the instruction cache and the data cache. In this way, even when direct fetching is stopped on one of the instruction cache and the data cache, direct fetching may be still be implemented in the other one of the instruction cache and the data cache. The locations of the separate instruction and data caches may also be stored in separate FLPRs.

In some other embodiments, direct fetching may be integrated with a directory coherence protocol. When an old tile receives from a new tile a direct fetch request for a requested block (or requested data block, requested data block, TLB entry, etc.), the old tile may be configured to respond to the new tile with the requested block. If the current cache coherence state of the block in the old tile is sufficient to satisfy the request from the new tile, the old tile may be configured to send a share notification to a relevant directory associated with the requested block. The share notification may be configured to instruct the relevant directory to update a sharing list by adding the new tile as a sharer of the requested block (in case, for example, the direct fetching arises from a read cache miss), or by changing the sharing list to indicate the new tile as the sole sharer of the requested block (in case, for example, the direct fetching arises from a write cache miss). Upon updating the sharing list, the relevant directory may be configured to respond to the share notification by sending an acknowledgement message to the old tile. Until the old tile receives the acknowledgement message, the old core may be configured to maintain knowledge that the old tile has sent the requested block to the new tile. When the old tile receives the acknowledgement message, the old tile may be configured to no longer maintain knowledge that the old tile has sent the requested block to the new tile because the relevant directory is now coherent. That is, the relevant directory may now properly indicate that both the new tile and the old tile contain the requested block, or that only the new tile contains the requested block.

In some other embodiments, direct fetching may be integrated with a hardware prefetcher. The hardware prefetcher may be adapted to guide the direct fetching. For example, the hardware prefetcher may be configured to detect sequential data access patterns of a core when the core executes a thread. The hardware prefetcher may be configured to predict future data accesses based on the detected access patterns. While direct fetching may remain profitable according to the profitability measure, the hardware prefetcher may be configured to instruct a new tile to prefetch data from an old tile according to the sequential access patterns. By prefetching data before the data is requested, latency associated with direct fetching can be reduced to zero or near zero. Upon prefetching the data, the new tile may be configured to store the prefetched data and flag a special bit associated with the prefetched data. When a block in the prefetched data as identified by the special bit is accessed, a success counter can be incremented, thereby tracking the effectiveness of the hardware prefetcher. When the success counter no longer indicates that the direct fetching by the hardware prefetcher is effective, the new tile may be adapted to configure the hardware prefetcher to use directory-based fetching.

In some other embodiments, the profitability measure may be adapted to determine performance profitability of multi-core architecture techniques configured to manage cache capacity sharing. In some implementations, a given tile may be adapted to utilize remote caches in nearby tiles to store data, such as by placing victim blocks from the local cache, or newly-fetched blocks, in remote caches. When other applications run on the cores in these nearby tiles, the nearby tiles may be configured to evict the data from the remote caches, thereby reducing the performance profitability of utilizing such remote caches. In such cases, the profitability measure may be adapted to determine whether the given tile should store data in the local cache or in the remote caches according to their performance profitability.

Turning now to FIG. 2, a diagram illustrates a table 200 representing multiple example bit vectors adapted to indicate one or more of the caches 108 that store a block corresponding to a given block address, in accordance with at least some embodiments presented herein. A given directory may include multiple bit vectors, each of which corresponds to one of multiple block addresses. The table 200 may include multiple rows 202A-202N, each of which corresponds to one of the multiple block addresses. The table 200 may also include multiple columns 204A-204N, each of which corresponds to one of the caches 108. The table 200 may further include multiple cells, such as cells 206A-206N, each of which corresponds to one of the multiple block addresses and one of the caches 108. The cells along a given row may represent a particular bit vector. For example, the cells 206A-206N along the first row 202A may represent an illustrative bit vector corresponding to a first block address.

In the example illustrated in FIG. 2, a logical one bit value may indicate that the corresponding cache stores the block, and a logical zero bit value may indicate that the corresponding cache does not store the block. Thus, the logical one bit values in the first bit values in the first cell 206A and the Nth cell 206N may indicate that the first cache and the Nth cache share the block. The bit vector corresponding to the cells 206A-206N may represent a number of bits corresponding to the number of caches in the multicore architecture. The controllers 112A-112D may be configured to dynamically update the bit vector as additional caches share the block and/or as caches become invalidated or intervened.

Figure 3:
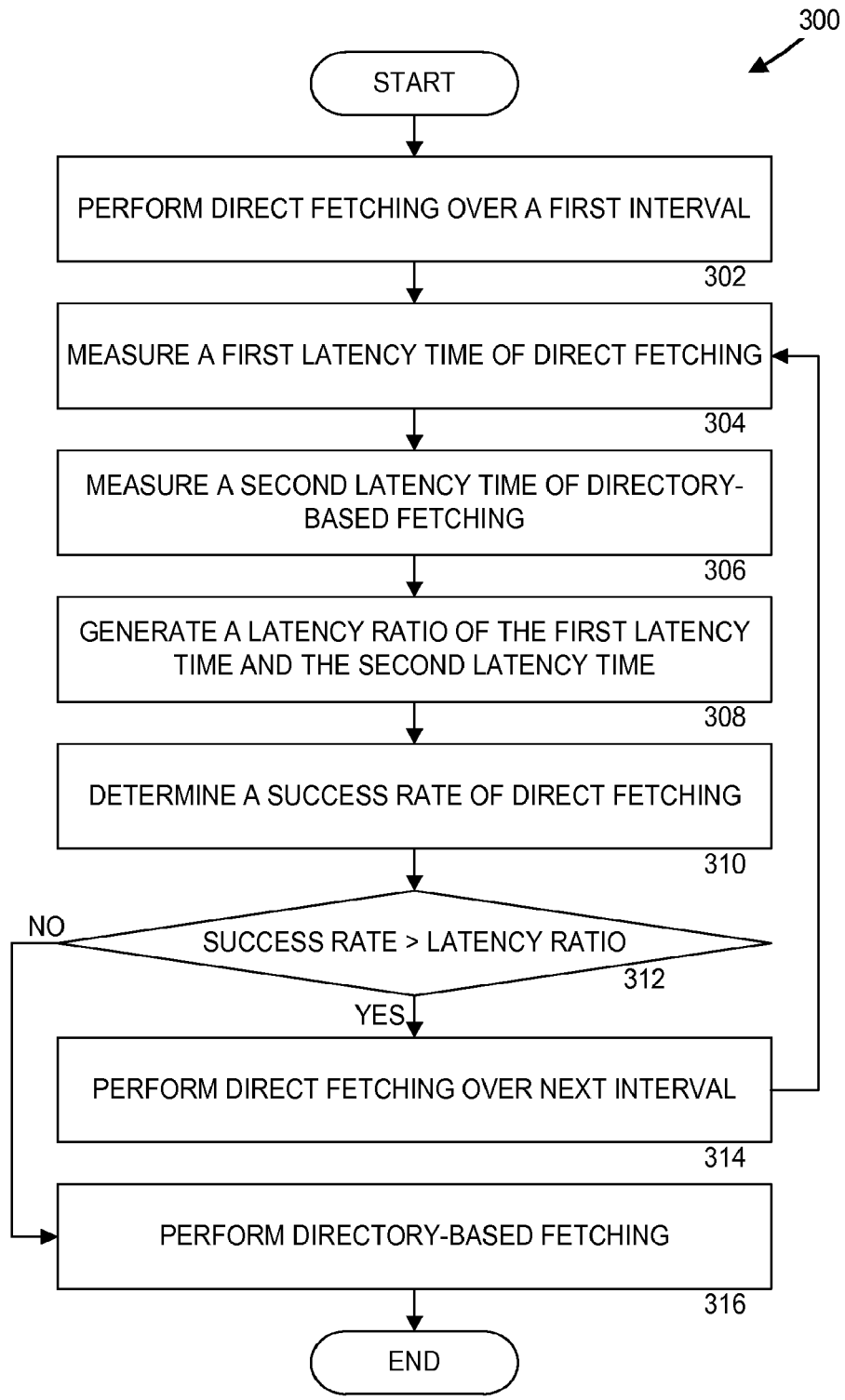
FIG. 3 is a flow diagram illustrating an example process adapted to dynamically evaluate a profitability measure and selectively perform direct fetching or directory-based fetching based on the profitability measure.

Turning now to FIG. 3, a flow diagram illustrates an example process 300 adapted to dynamically evaluate a profitability measure and selectively perform direct fetching or directory-based fetching based on the profitability measure, in accordance with at least some embodiments presented herein. The process 300 may include various operations, functions, or actions as illustrated by one or more of blocks 302 through 316.

The process 300 may begin at block 302 (Perform Direct Fetching Over a First Interval), where a controller in a new tile may be configured to perform direct fetching over a first time interval. When the new tile incurs a cache miss, the controller may be configured to directly fetch requested data from a cache on an old tile from which a thread was migrated to the new tile. The first interval may correspond to a predefined number of fetches. If direct fetching fails, then the controller may be adapted to perform directory-based fetching. Block 302 may be followed by block 304.

At block 304 (Measure a First Latency Time of Direct Fetching), the controller may be configured to measure a first latency time by measuring an amount of elapsed time (i.e. latency) from the initiation of a direct fetch of data from the old tile and the completion of the direct fetch. The controller may be configured to measure the first latency time of direct fetching for multiple direct fetches, log the measured latency associated with each direct fetch, and/or calculate an average of the latency times for the collection of direct fetches processed over a given interval. Block 304 may be followed by block 306.

At block 306 (Measure a Second Latency Time of Directory-Based Fetching), the controller may be configured to measure a second latency time by measuring an amount of elapsed time (i.e., latency) from the initiation of a request to a relevant directory for a location of the old tile that contains requested data and the completion of the fetch from the cache on the old tile. The controller may be configured to measure the second latency time for multiple directory-based fetches, log an amount of time for each directory-based fetch, and/or calculate an average of the latency times for the collection of directory-based fetches over the given interval. Block 306 may be followed by block 308.

In an illustrative example of directory-based fetching, the third directory may correspond to the block address of the requested block. As a result, the first tile may be configured to query the third directory for a location of a cache that contains the requested block. The third directory may be configured to respond to the query by notifying the fourth cache according to a location of the fourth cache. The fourth cache may then respond by providing the requested block to the second tile.

At block 308 (Determine Latency Ratio of the First Latency Time to Second Latency Time), the controller may be configured to determine a latency ratio of the first latency time to the second latency time. The latency ratio may express an effectiveness of direct fetching over directory-based fetching with respect to latency time. For example, if the first latency time is significantly lower than the second latency time, then the latency ratio will be much less than one, thereby indicating a higher effectiveness of direct fetching over directory-based fetching. If the first latency time is about the same as the second latency time, then the latency ratio will be about one, thereby indicating a lower effectiveness of direct fetching over directory-based fetching. Block 308 may be followed by block 310.

At block 310 (Determine a Success Rate of Direct Fetching), the controller may be configured to determine a success rate by counting a number of times that direct fetching is successful over the given interval. Direct fetching may be considered successful when data is retrieved from the old tile. Direct fetching may be considered unsuccessful when data is not retrieved from the old tile. The success rate may be expressed as a ratio of the number of times that direct fetching is successful to a total number of fetches over the given interval. Block 310 may be followed by block 312.

At block 312 (Determine Whether Success Rate is Greater than Latency Ratio), the controller may be configured to determine whether the success rate is greater than the latency ratio of the first latency time to the second latency time. Direct fetching may be considered profitable over the given interval if the success rate is greater than the latency ratio. Directory-based fetching may not be considered profitable over the given interval if the success rate is not greater than the latency ratio. If the controller determines that direct fetching is profitable, then block 312 may be followed by block 314. If the controller determines that direct fetching is not profitable, then block 312 may be followed by block 316. In addition to the above, there may be additional techniques for determining profitability. In a first example case, if there has not been any directory-based fetching in the given interval, direct fetching may be considered profitable. In a second example case, if there has not been any direct fetching in the given interval, direct fetching may be considered not profitable, and directory-based fetching may be considered profitable.

At block 314 (Perform Direct Fetching Over Next Interval), the controller may be configured to continue performing direct fetching over a next interval following the first interval. Block 314 may be followed by block 304. Blocks 304-314 may be repeated for each successive interval until the controller determines that direct fetching is no longer profitable.

At block 316 (Perform Directory-Based Fetching), the controller may be configured to transition from direct fetching operations to directory-based fetching operations over succeeding intervals. In some embodiments, the controller may include various operating modes, including a direct fetching mode and/or a directory-based fetching mode. The determination as to whether the controller operates in the direct fetching mode or the directory-based mode based on the success rate and latency ratio determination of block 312. The operating mode selection may be implemented as hardware, software, firmware, or combinations thereof. After block 316, the process 300 may either repeat (e.g., periodically, continuously, or on demand as needed) or terminate.

Figure 4:
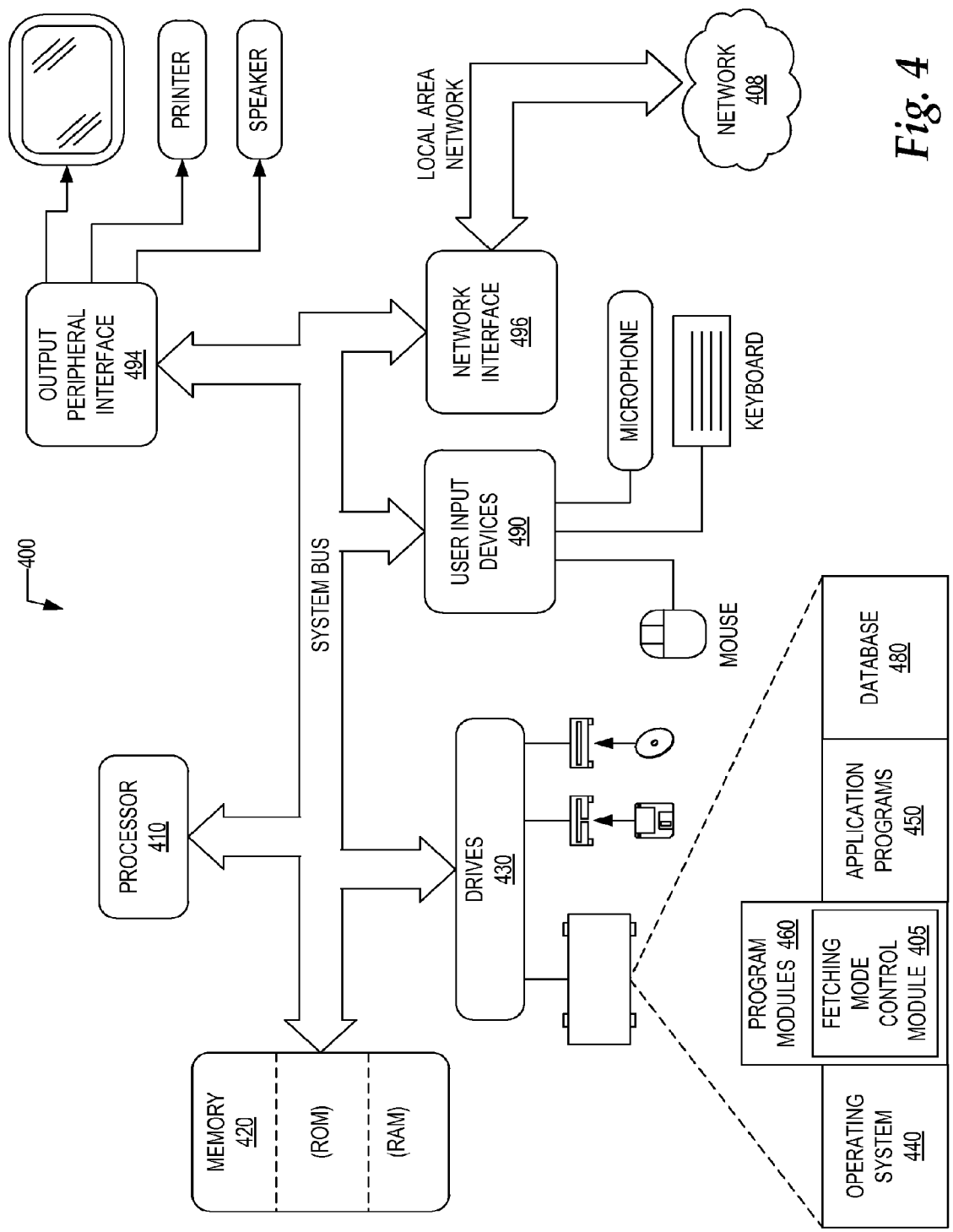
FIG. 4 is a block diagram illustrating a computer hardware architecture for an example computing system.

FIG. 4 is a block diagram illustrating a computer hardware architecture for an example computing system configured in accordance with at least some embodiments presented herein. FIG. 4 includes a computer 400, including a processor 410, memory 420 and one or more drives 430. The computer 400 may be implemented as a conventional computer system, an embedded control computer, a laptop, or a server computer, a mobile device, a set-top box, a kiosk, a vehicular information system, a mobile telephone, a customized machine, or other hardware platform.

The drives 430 and their associated computer storage media, provide storage of computer readable instructions, data structures, program modules and other data for the computer 400. The drives 430 can include an operating system 440, application programs 450, program modules 460, and a database 480. The program modules 460 may include a fetching mode control module 405. The fetching control module 405 may be adapted to execute the process 300 for dynamically evaluating a profitability measure and selectively perform direct fetching or directory-based fetching based on the profitability measure as described in greater detail above (e.g., see previous description with respect to one or more of FIGS. 1-3). In some embodiments, the fetching mode control module 405 may switch between a direct fetching mode and a directory-based fetching mode based on a success rate and latency ratio. The computer 300 further includes user input devices 490 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be coupled to the processor 410 through a user input interface that is coupled to a system bus, but may be coupled by other interface and bus structures, such as a parallel port, game port or a universal serial bus ("USB"). Computers such as the computer 400 may also include other peripheral output devices such as speakers, which may be coupled through an output peripheral interface 494 or the like.

The computer 400 may operate in a networked environment using logical connections to one or more computers, such as a remote computer coupled to a network interface 496. The remote computer may be a personal computer, a server, a router, a network PC, a peer device or other common network node, and can include many or all of the elements described above relative to the computer 400. Networking environments are commonplace in offices, enterprise-wide area networks ("WAN"), local area networks ("LAN"), intranets, and the Internet.

When used in a LAN or WLAN networking environment, the computer 400 may be coupled to the LAN through the network interface 496 or an adapter. When used in a WAN networking environment, the computer 400 typically includes a modem or other means for establishing communications over the WAN, such as the Internet or the network 408. The WAN may include the Internet, the illustrated network 408, various other networks, or any combination thereof. It will be appreciated that other mechanisms of establishing a communications link, ring, mesh, bus, cloud, or network between the computers may be used.

According to some embodiments, the computer 400 may be coupled to a networking environment. The computer 400 may include one or more instances of a physical computer-readable storage medium or media associated with the drives 430 or other storage devices. The system bus may enable the processor 410 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 420, whether characterized as RAM, ROM, flash, or other types of volatile or nonvolatile memory technology. The media may also represent secondary storage, whether implemented as the storage drives 430 or otherwise. Hard drive implementations may be characterized as solid state, or may include rotating media storing magnetically-encoded information.

The storage media may include one or more program modules 460. The program modules 460 may include software instructions that, when loaded into the processor 410 and executed, transform a general-purpose computing system into a special-purpose computing system. As detailed throughout this description, the program modules 460 may provide various tools or techniques by which the computer 400 may participate within the overall systems or operating environments using the components, logic flows, and/or data structures discussed herein.

The processor 410 may be constructed from any number of transistors or other circuit elements, which may individually or collectively assume any number of states. More specifically, the processor 410 may operate as a state machine or finite-state machine. Such a machine may be transformed to a second machine, or specific machine by loading executable instructions contained within the program modules 460. These computer-executable instructions may transform the processor 410 by specifying how the processor 410 transitions between states, thereby transforming the transistors or other circuit elements constituting the processor 410 from a first machine to a second machine. The states of either machine may also be transformed by receiving input from the one or more user input devices 490, the network interface 496, other peripherals, other interfaces, or one or more users or other actors. Either machine may also transform states, or various physical characteristics of various output devices such as printers, speakers, video displays, or otherwise.

Encoding the program modules 460 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 460 may transform the physical state of the semiconductor memory 420 when the software is encoded therein. For example, the software may transform the state of transistors, capacitors, or other discrete circuit elements constituting the semiconductor memory 420.

As another example, the storage media may be implemented using magnetic or optical technology such as drives 430. In such implementations, the program modules 460 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 5A:
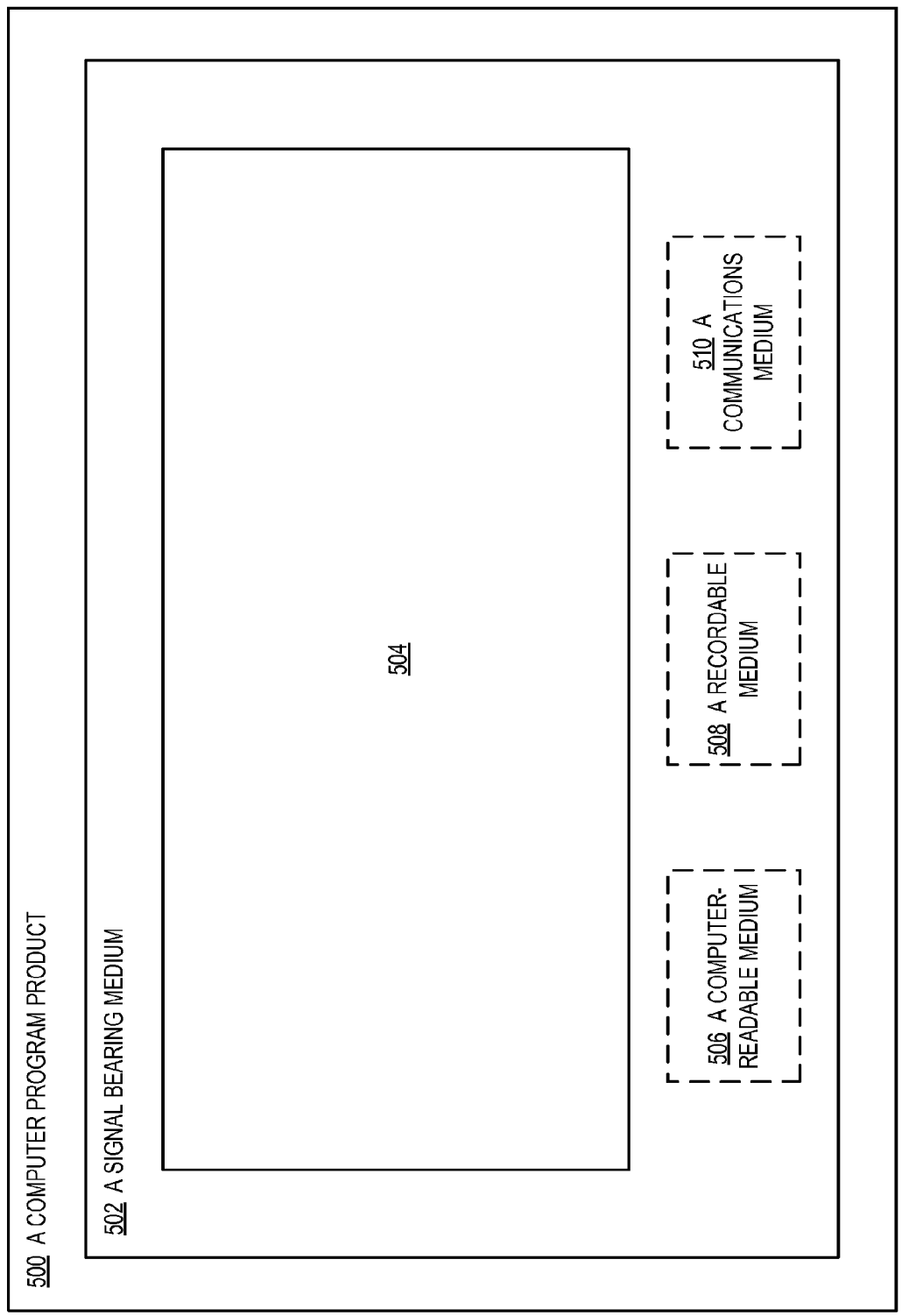

Turning now to FIGS. 5A-5B, a schematic diagram that illustrates a computer program product 500 that includes a computer program for executing a computer process on a computing device, arranged according to at least some embodiments presented herein. An illustrative embodiment of the example computer program product is provided using a signal bearing medium 502, and may include at least one instruction of 504: one or more instructions for initiating migration of a thread executing on a first core at a first tile from the first tile to a second tile in a multicore processor; one or more instructions for determining block addresses of blocks to be transferred from a first cache at the first tile to a second cache at the second tile; one or more instructions for identifying a third tile comprising a directory corresponding to the block addresses; one or more instructions for updating the directory to reflect that the second cache shares the blocks; or one or more instructions for transferring the blocks from the first cache to the second cache. In some embodiments, the signal bearing medium 502 of the one or more computer program products 500 include a computer readable medium 506, a recordable medium 508, and/or a communications medium 510.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multi-core processor systems, microprocessor-based or programmable consumer electronics, minicomputers, mainframe computers, and the like.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to determine a profitability of direct fetching in a multicore processor, comprising:
   migrating a first thread executing on a first core at a first tile in the multicore processor from the first tile to a second core at a second tile in the multicore processor, the first tile comprising the first core and a first cache, the second tile comprising the second core, a second cache, and a fetch location pointer register (FLPR);
   in response to migrating the first thread from the first tile to the second tile, storing a first location of the first cache in the FLPR at the second tile, and executing the first thread on the second core; and
   in response to executing the first thread on the second core, identifying a cache miss for a block in the second cache, evaluating a profitability measure of fetching the block based on measured latency times to perform direct fetching and directory-based fetching of the block and a success rate of direct fetching to determine whether the profitability measure indicates direct fetching or directory-based fetching,
   in response to the profitability measure of fetching the block being determined to indicate direct fetching, performing direct fetching of the block from the first cache to the second cache utilizing the FLPR, and
   in response to the profitability measure of fetching the block being determined to indicate directory-based fetching, performing directory-based fetching of the block from the first cache to the second cache.

2. The method of claim 1, wherein evaluating the profitability measure of fetching the block to determine whether the profitability measure indicates direct fetching or directory-based fetching comprises:
   determining a first latency time to perform direct fetching of the block from the first cache to the second cache;
   determining a second latency time to perform directory-based fetching of the block from the first cache to the second cache;
   determining a latency ratio by dividing the first latency time by the second latency time; identifying the success rate of direct fetching of the FLPR;
   determining that the profitability measure of fetching the block indicates direct fetching in response to the success rate being greater than the latency ratio; and
   determining that the profitability measure of fetching the block indicates directory-based fetching in response to the success rate not being greater than the latency ratio.

3. The method of claim 1, wherein performing direct fetching of the block from the first cache to the second cache utilizing the FLPR comprises:
   in response to identifying the cache miss for the block in the second cache, retrieving the first location from the FLPR;
   sending a fetch request for the block from the second cache to the first cache as identified by the retrieved first location;
   in response to the fetch request, determining whether the first cache contains the block or whether the first cache fails to contain the block;
   in response to determining that the first cache contains the block, retrieving the block from the first cache; and
   sending the retrieved block from the first cache to the second cache.

4. The method of claim 3, further comprising:
   in response to determining that the first cache fails to contain the block, sending a negative acknowledgement from the first cache to the second cache;
   in response to the negative acknowledgement, sending a query for the block from the second cache to a directory at a third tile in the multicore processor, the third tile comprising a third core, a third cache, and the directory;
   in response to the query to the directory, retrieving a second location of a fourth cache at a fourth tile in the multicore processor from the directory, the fourth tile comprising a fourth core and the fourth cache;
   sending a second fetch request for the block from the second cache to the fourth cache as identified by the second location;
   in response to the second fetch request, retrieving the block from the fourth cache; and
   sending the retrieved block from the fourth cache to the second cache.

5. The method of claim 3, further comprising:
   tracking, at the second tile, the block, which is shared between the first cache and the second cache;
   sending a share notification from the second tile to a third tile in the multicore processor, the third tile comprising a third core, a third cache, and a directory, the directory comprising a sharing list for the block;
   in response to the share notification, updating the sharing list to specify the first cache and the second cache;
   sending, from the third tile to the second tile, an acknowledgement message to indicate that the sharing list has been updated to specify the first cache and the second cache; and
   in response to the acknowledgement message, terminating the tracking of the block at the second tile.

6. The method of claim 5, wherein the sharing list comprises a bit vector, the bit vector comprising a plurality of bits, each of the plurality of bits corresponding to one of a plurality of tiles in the multicore processor, a value of each of the bits specifying whether a corresponding one of the tiles includes a cache that contains the block.

7. The method of claim 1, wherein performing directory-based fetching of the block from the first cache to the second cache comprises:

sending a query for the block from the second cache to a directory at a third tile in the multicore processor, the third tile comprising a third core, a third cache, and the directory;

in response to the query to the directory, retrieving the first location of the first cache from the directory;

sending a fetch request for the block from the second cache to the first cache as identified by the retrieved first location;

in response to the fetch request, retrieving the block from the first cache; and sending the retrieved block from the first cache to the second cache.

8. The method of claim 1, further comprising executing a hardware prefetcher configured to retrieve predicted blocks from the first cache and store the predicted blocks in the second cache.

9. The method of claim 8, further comprising:
migrating a second thread executing on the first core from the first tile to the second tile, and executing the second thread on the second core;
evaluating the execution of the second thread to determine whether the second thread on the second core utilizes one of the predicted blocks in the second cache; and
in response to the execution of the second thread on the second core being determined to utilize one of the predicted blocks in the second cache, incrementing a success counter for the hardware prefetcher.

10. The method claim 1, wherein the first tile further comprises a first translation lookaside buffer (TLB), wherein the second tile further comprises a second TLB, and the method further comprising:
in response to executing the first thread on the second core, identifying a TLB miss for an entry in the second TLB;
evaluating a second profitability measure of fetching the entry to determine whether the second profitability measure indicates direct fetching or a page table walk;
in response to the second profitability measure of fetching the entry being determined to indicate direct fetching, performing direct fetching of the entry from the first TLB to the second TLB; and
in response to the second profitability measure of fetching the entry being determined to indicate the page table walk, performing the page table walk of the entry in the multicore processor.

11. A multicore processor, comprising:
a first tile comprising a first core and a first cache;
a second tile comprising a second core, a second cache, and a fetch location pointer register (FLPR); and
wherein the multicore processor is configured to:
migrate a first thread on the first core at the first tile to the second core at the second tile;
in response to migration of the first thread from the first tile to the second tile, store a first location of the first cache in the FLPR, and execute the thread on the second core; and
in response to execution of the thread on the second core, identify a cache miss for a block in the second cache, evaluate a profitability measure to fetch the block based on measured latency times to perform direct fetching and directory-based fetching of the block and a success rate of direct fetching to determine whether the profitability measure indicates direct fetching or directory-based fetching,
in response to the profitability measure to fetch the block being determined to indicate direct fetching, perform direct fetching of the block from the first cache to the second cache utilizing the FLPR, and
in response to the profitability measure to fetch the block being determined to indicate directory-based fetching, perform directory-based fetching of the block from the first cache to the second cache.

12. The multicore processor of claim 11, wherein to evaluate the profitability measure to fetch the block, the multicore processor is configured to:
determine a first latency time to perform direct fetching of the block from the first cache to the second cache;
determine a second latency time to perform directory-based fetching of the block from the first cache to the second cache;
determine a latency ratio as a division of the first latency time by the second latency time; identify the success rate of direct fetching of the FLPR;
determine that the profitability measure to fetch the block indicates direct fetching in response to the success rate being greater than the latency ratio; and
determine that the profitability measure to fetch the block indicates directory-based fetching in response to the success rate not being greater than the latency ratio.

13. The multicore processor of claim 11, wherein to perform direct fetching of the block from the first cache to the second cache utilizing the FLPR, the multicore processor is configured to:
retrieve the first location from the FLPR in response to identification of the cache miss for the block in the second cache;
send a fetch request for the block from the second cache to the first cache as identified by the retrieved first location;
in response to the fetch request, determine whether the first cache contains the block or whether the first cache fails to contain the block;
retrieve the block from the first cache in response to the first cache being determined to contain the block; and
send the retrieved block from the first cache to the second cache.

14. The multicore processor of claim 13, wherein the multicore processor further comprises a third tile and a fourth tile, the third tile comprising a third core, a third cache, and a directory, the fourth tile comprising a fourth core and a fourth cache; and wherein the multicore processor is further configured to:
send a negative acknowledgement from the first cache to the second cache in response to determination by the multicore processor that the first cache fails to contain the block;
in response to the negative acknowledgement, send a query for the block from the second cache to the directory;
in response to the query to the directory, retrieve a second location of the fourth cache from the directory;
send a second fetch request for the block from the second cache to the fourth cache as identified by the second location;
in response to the second fetch request, retrieve the block from the fourth cache; and
send the retrieved block from the fourth cache to the second cache.

15. The multicore processor of claim 13, wherein the multicore processor further comprises a third tile, the third tile comprising a third core, a third cache, and a directory, the directory comprising a share list for the block; and wherein the multicore processor is further configured to:
track, at the second tile, the block, which is shared between the first cache and the second cache;

send a share notification from the second tile to the third tile;

in response to the share notification, update the share list to specify the first cache and the second cache;

send, from the third tile to the second tile, an acknowledgement message to indicate that the share list has been updated to specify the first cache and the second cache; and in response to the acknowledgement message, terminate the track of the block at the second tile.

16. The multicore processor of claim 15, wherein the share list comprises a bit vector, the bit vector comprising a plurality of bits, each of the plurality of bits corresponding to one of a plurality of tiles in the multicore processor, a value of each of the bits specify whether a corresponding one of the tiles includes a cache that contains the block.

17. The multicore processor of claim 11, wherein the multicore processor further comprises a third tile, the third tile comprising a third core, a third cache, and a directory; and wherein to perform directory-based fetching of the block from the first cache to the second cache, the multicore processor is configured to:

send a query for the block from the second cache to the directory;

in response to the query to the directory, retrieve the first location of the first cache from the directory;

send a fetch request for the block from the second cache to the first cache as identified by the retrieved first location;

in response to the fetch request, retrieve the block from the first cache; and send the retrieved block from the first cache to the second cache.

18. The multicore processor of claim 11, further comprising a hardware prefetcher configured to prefetch predicted blocks from the first cache into the second cache; and wherein to perform directory-based fetching of the block from the first cache to the second cache, the hardware prefetcher is configured to retrieve the predicted blocks from the first cache and store the predicted blocks in the second cache.

19. The multicore processor of claim 18, wherein the hardware prefetcher comprises a success counter; and wherein the multicore processor is further configured to:

migrate a second thread on the first core at the first tile to the second tile, and execute the second thread on the second core;

evaluate the execution of the second thread on the second core to determine whether the second thread on the second core utilizes one of the predicted blocks in the second cache; and in response to the execution of the second thread on the second core being determined to utilize one of the predicted blocks in the second cache, increment the success counter for the hardware prefetcher.

20. The multicore processor of claim 11, wherein the first tile further comprises a first translation lookaside buffer (TLB), wherein the second tile further comprises a second TLB, and wherein the multicore processor is further configured to:

in response to execution of the first thread on the second core, identify a TLB miss for an entry in the second TLB;

evaluate a second profitability measure to fetch the entry to determine whether the second profitability measure indicates direct fetching or a page table walk;

perform direct fetching of the entry from the first TLB to the second TLB in response to the second profitability measure being determined to indicate direct fetching; and perform the page table walk of the entry in the multicore processor in response to the second profitability measure being determined to indicate the page table walk.

21. A multicore processor, comprising:

a first tile comprising a first core, a first instruction cache, and a first data cache; and a second tile comprising a second core, a second instruction cache, a second data cache, a fetch location pointer register (FLPR);

wherein the multicore processor is configured to:

migrate a thread on the first core at the first tile to the second core at the second tile;

in response to migration of the thread from the first tile to the second tile, store a location of the first cache in the FLPR, and execute the thread on the second core; and in response to execution of the thread on the second core, identify an instruction cache miss for a first block in the second instruction cache and a data cache miss for a second block in the second data cache, evaluate a first profitability measure to fetch the first block based on measured first latency times to perform direct fetching and directory-based fetching of the first block and a first success rate of direct fetching to determine whether the first profitability measure indicates direct fetching or directory-based fetching, in response to the first probability measure to fetch the first block being determined to indicate direct fetching, perform direct fetching of the first block from the first instruction cache to the second instruction cache utilizing the FLPR, in response to the first probability measure to fetch the first block being determined to indicate directory-based fetching, perform directory-based fetching of the first block from the first instruction cache to the second instruction cache, evaluate a second profitability measure to fetch the second block based on measured second latency times to perform direct fetching and directory-based fetching of the second block and a second success rate of direct fetching to determine whether the second probability measure indicates direct fetching or directory-based fetching, in response to the second probability measure to fetch the second block being determined to indicate direct fetching, perform direct fetching of the second block from the first data cache to the second data cache utilizing the FLPR, and in response to the second probability measure to fetch the second block being determined to indicate directory-based fetching, perform directory-based fetching of the second block from the first data cache to the second data cache.

22. The multicore processor of claim 21, wherein the FLPR comprises a first FLPR to store a location of the first instruction cache and a second FLPR to store a location of the first data cache.

23. A non-transitory computer-readable storage medium having computer-executable instructions stored thereon which, in response to execution by a computer, cause the computer to:

migrate a thread on a first core at a first tile in a multicore processor from the first tile to a second core at a second tile in the multicore processor, the first tile comprising the first core and a first cache, the second tile comprising the second core, a second cache, and a fetch location pointer register (FLPR);

in response to migration of the thread from the first tile to the second tile, store a location of the first cache in the FLPR at the second tile, and execute the thread on the second core; and in response to execution of the thread on the second core, identify a cache miss for a block in the second cache, evaluate a profitability measure to fetch the block based on measured latency times to perform direct fetching and directory-based fetching of the block and a success rate of direct fetching to determine whether the profitability measure indicates direct fetching or directory-based fetching, in response to the profitability measure to fetch the block being determined to indicate direct fetching, perform direct fetching of the block from the first cache to the second cache utilizing the FLPR, and in response to the profitability measure to fetch the block being determined to indicate directory-based fetching, perform directory-based fetching of the block from the first cache to the second cache.

24. The non-transitory computer-readable storage medium of claim 23, wherein to evaluate the profitability measure to fetch the block to determine whether the profitability measure indicates direct fetching or directory-based fetching, the computer-readable storage medium includes computer-executable instructions stored thereon which, in response to execution by the computer, cause the computer to:

determine a first latency time to perform direct fetching of the block from the first cache to the second cache;

determine a second latency time to perform directory-based fetching of the block from the first cache to the second cache;

determine a latency ratio by dividing the first latency time by the second latency time; identify a success rate of the FLPR;

determine that the profitability measure to fetch the block indicates direct fetching in response to the success rate being greater than the latency ratio; and determine that the profitability measure to fetch the block indicates directory-based fetching in response to the success rate not being greater than the latency ratio.

* * * * *

UNITED STATES PATENT AND TRADEMARK OFFICE
CERTIFICATE OF CORRECTION

PATENT NO. : 8,832,414 B2  
APPLICATION NO. : 13/387210  
DATED : September 9, 2014  
INVENTOR(S) : Solihin Page 1 of 1

It is certified that error appears in the above-identified patent and that said Letters Patent is hereby corrected as shown below:

In the Specification

In Column 1, Line 4, below Title, insert -- CROSS-REFERENCE TO RELATED APPLICATION
The present application is a U.S. national stage filing under 35 U.S.C. §371 of International Application No. PCT/US2011/029759, filed on Mar. 24, 2011, the entire contents of which are incorporated herein by reference. --.

In Column 4, Line 47, delete "fetching"" and insert -- fetching." --, therefor.

In the Claims

In Column 19, Line 30, in Claim 10, delete "method claim" and insert -- method of claim --, therefor.

Signed and Sealed this
Seventh Day of April, 2015

Michelle K. Lee
*Director of the United States Patent and Trademark Office*